INVENTOR.
RICHARD W. BUTSCH

United States Patent Office 3,213,482
Patented Oct. 26, 1965

3,213,482
SANITARY CASTER
Richard W. Butsch, Evansville, Ind., assignor to Faultless Caster Corporation, Evansville, Ind., a corporation of Indiana
Filed Feb. 11, 1963, Ser. No. 257,500
8 Claims. (Cl. 16—21)

This invention relates generally to casters and more particularly to a caster which can be constructed economically of non-corrosive materials, which is not inclined to foul or accumulate dirt and debris, which can be easily cleaned, and which can be easily disassembled and maintained.

Meat packing plants, bakeries, and other food processing plants operate caster equipped trucks under conditions which contaminate casters with debris and tend to corrode metal surfaces. Manufacturing and chemical industries also operate caster equipped trucks under conditions which tend to foul casters and corrode metal parts. The food service industry and hospitals also operate caster equipped trucks. Wherever casters are used in these industries, it is important that the casters be constructed of corrosion resistant materials and that they be constructed in a manner faciliating easy cleaning. In the food industry and hospital applications, it is also important that the casters be constructed in such a manner as to facilitate cleaning to acceptable sanitary standards. While casters have long been used in the above mentioned industries, those casters available heretofore have not had all of the features desired.

It is, therefore, a general object of the present invention to provide an improved caster.

A further object is to provide a caster having no tendency to accumulate debris.

A further object is to provide a caster which can be easily disassembled and reassembled and maintained.

A further object is to provide a caster which can be easily cleaned even to a degree acceptable in the food processing and service industries and in hospitals.

A further object is to provide a caster of a type which can be manufactured readily and economically from corrosion resistant materials including stainless steel.

A still further object is to provide a caster which, by the use of several basic subassemblies of a standardized size together with simple and inexpensive parts which can be furnished in a variety of sizes and proportions economically, can be furnished in a wide range of caster heights and offsets.

The full nature of the invention will be understood from the accompanying drawings and the following description and claims.

Figures 1, 2, 3:
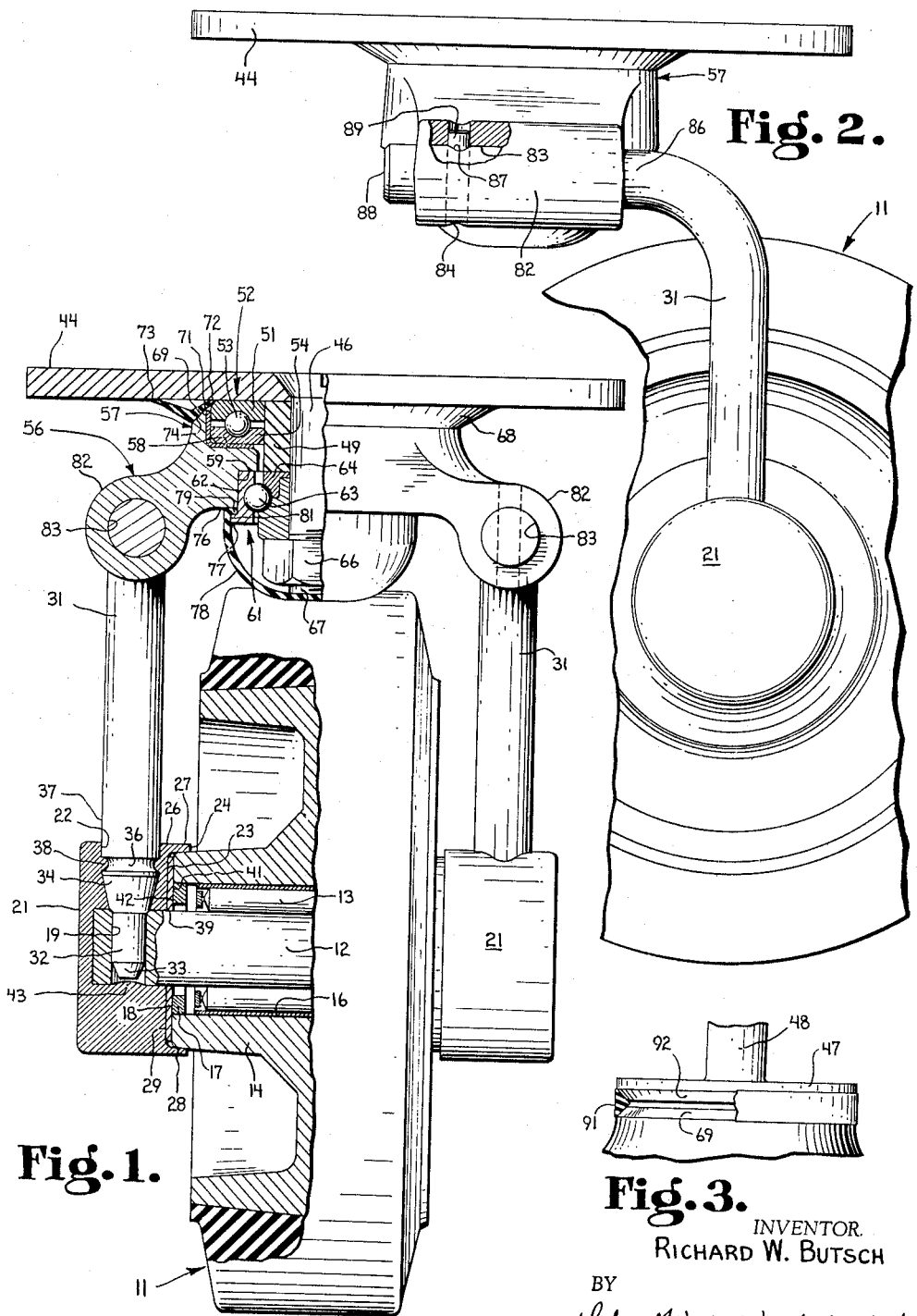
FIG. 1 is a front elevation of a typical embodiment of the present invention, one-half of the view being shown in section to illustrate certain details of construction.
FIG. 2 is a side elevation of the caster of FIG. 1 with portions of the wheel omitted.
FIG. 3 is a fragmentary view showing an alternative construction for the mounting portion of the caster.

Referring to the drawings in detail, the caster includes a rubber tired wheel 11 having an axle 12 with needle or roller bearings 13 transmitting the radial loads from the axle to the wheel. If the wheel hub 14 is made of a comparatively soft material, a hardened sleeve 16 may be provided in the bore thereof for a bearing contact surface and a ring 17 may be provided in the bore at each end thereof for engagement with the washer 18 to maintain the axial location of the wheel on the axle in a manner which will become apparent.

A round aperture 19 is provided adjacent each end of the axle 12, extending transversely through the center thereof. A resilient member 21 which is generally in the form of a cup is mounted on the end portion of the axle 12 and has an aperture 22 therein which is co-axial with the aperture 19 of the axle. The cup is circular as can be seen in FIG. 2 and has a circular cavity 23 in the inner face 24 thereof. The cavity 23 extends close to the outer circumferential surface 26 of the resilient member and, therefore, the face 24 remaining is annular and of comparatively small radial dimension by comparison with the diameter of the surface 26. However, it is in this manner that a lip 27 is formed which embraces the circumferential surface 28 of the hub 14 adjacent the outer face 29 of the hub. Because of the fact that the diameter of the surface 28 is slightly greater than the unstressed inside diameter of the lip 27, the lip does embrace this surface when the resilient member is in the position shown and, therefore, effects a seal on the hub. It thereby excludes dirt and debris from the bearings and retains lubricant in the bearings.

Support legs 31 are provided. These legs are made of round rods and minimize the surface area on which debris can accumulate, and their construction or fabrication can be readily accomplished. The portion 32 adjacent the lower end of each leg is in the form of a pin and has a tapered or rounded surface 33 at the lower end thereof. The portion 32 fits the aperture 19 in the axle.

Immediately above the portion 32 is a second tapered portion 34 received in the aperture 22 of the resilient member 21. Immediately above this tapered portion is a semicircular groove 36 above which is the cylindrical portion 37 which is essentially the size of the remainder of the leg. The aperture 22 of the resilient member has a circular rib 38 of semicircular cross section which is received in the groove 36 and securely retains the leg in the resilient member as well as in position in the axle. The leg being thus retained serves to retain the resilient member on the axle in opposition to axial forces transmitted between the wheel and the resilient member. Thus it is seen that the resilient member serves not only as a junction member but also as a seal and is therefore referred to as the junction seal hereinafter.

To provide suitable wearing surfaces between the junction seal and the wheel hub, the washer 18 is disposed in the cavity 23 of the seal and has an aperture 39 in the center thereof of a size sufficient to permit passage of the axle therethrough during assembly. As the wheel rotates, the washer 18 normally remains stationary and axial loads are transmitted between the inner face 41 thereof and the outer face 42 of the ring 17 and face 29 of the hub.

The junction seals should be made of resilient, chemical resistant, lubricant resistant, and abrasion resistant materials such as rubber or plastic. The stressing of the seal during assembly to the axle and wheel hub assures that the seal will maintain contact with the rotating wheel hub and fully enclose the ends of the axle in cooperation with the legs 31. There is, therefore, no chance of loss of lubricants from the wheel bearing nor is there any chance of contamination of the bearings from the exterior. The seals are properly positioned by the support legs to prevent side movement of the wheel, the hardened side washer 18 preventing abrasion of the seal.

The junction seals of course hold the axle and support legs in proper relationship by means of the integral ring 38 in the seals snapping into the groove 36 of the legs. This relationship is maintained under operating conditions. However, the wheel and axle assembly can be easily removed from the support legs whenever it is desirable to do so.

A projection 43 is provided in the seal for projection slightly into the aperture 19 of the axle during assembly to properly locate the axle relative to the junction seal and thereby facilitate easy assembly of the wheel and axle assembly to the support legs.

The embodiment of the caster illustrated in FIGS. 1 and 2 employs a top plate 44 with a kingpin 46 in the center thereof, though a top washer 47 and stem assembly 48 (FIG. 3) can also be used if desired. A spacer 49 is provided between the kingpin 46 and the upper race 51 of the upper bearing assembly 52. This bearing assembly, of course, includes the bearing balls 53 and lower race 54.

A bearing housing 56 has an upper exterior wall portion 57 which is cylindrical. It has a cylindrical recess 58 accommodating the upper bearing assembly. It also has a cylindrical recess 59 accommodating the lower bearing assembly 61. The lower bearing assembly includes the outer race 62 received in the recess 59 of the bearing housing, the bearing balls 63, and the inner race 64 received on the kingpin 46. A jam nut 66 threadedly received on the threaded portion 67 of the kingpin serves to secure the upper and lower bearing assemblies, spacer, bearing housing, and top plate and kingpin in assembly.

An upper seal 68 which is annular in form is generally V-shaped in cross section as illustrated. A chamfer 69 is provided on the bearing housing immediately above the cylindrical wall portion 57 and extends up to a point 71 adjacent the opening of the cylindrical recess 58. This is at the upper margin of the bearing housing. The seal 68 is of a size requiring that it be stretched to encircle the chamfer 69. The upper inner edge 72 of the seal therefore touches the top plate as does the upper outer edge 73 of the seal. The face 74 of the seal engages the chamfer 69 of the bearing housing. This seal is made of resilient, chemical resistant, abrasion resistant, and lubricant resistant material such as rubber or plastic, for example. By being stressed during assembly of the top plate and bearing housing, the seal contracts to maintain pressure contact with both the bearing housing and top plate. The seal is not permanently attached to either surface and is free to move relative to the surface offering the least resistance whenever the bearing housing is rotated with respect to the top plate. It is seen, therefore, that the construction of the bearing housing is such as to permit the sealing of the bearings against loss of lubricants and also sealing from exterior contamination.

The bearing housing is provided with a flat surface 76 adjacent the recess 59. The outer race 62 of the lower bearing assembly has a flange 77 thereon extending outwardly in face to face relationship to the face 76 of the bearing housing. A lower seal 78 is provided having a lip 79 sandwiched between the surface 76 of the housing and the flange 77 of the bearing race. This seal is of a size such that in its normal, unstressed condition, the diameter of the inner wall 81 thereof is less than the diameter of the flange 77. Therefore, it requires stretching of the seal in order to install it as shown and in the installed condition, the seal does remain stretched to some extent. This seal is made of resilient, chemical resistant, and lubricant resistant material such as rubber or plastic, for example. By being stressed during assembly and remaining in a slightly stressed condition upon assembly, the seal maintains contact with the lower surface of the bearing housing and the lower bearing flange. The seal is not permanently attached to the parts and may be removed whenever desirable to do so. It is effective to exclude contaminants and to contain lubricants.

The bearing housing includes a pair of leg receiving portions 82, each of which has an aperture 83 therethrough to receive the upper portion of each leg 31. Each of the portions 82 has an aperture 84 extending therethrough transverse to the apertures 83. Likewise, the upper portions 86 of the legs have apertures 87 therein near the forward ends 88 thereof. These apertures 84 and 87 are aligned and a drive pin 89 is used to secure the support leg and bearing housing together. These drive pins can be of the vibration proof type, and yet they can be readily removed to permit removal of the support legs from the bearing housing. They correctly position the support legs and prevent rotation of the legs in the bearing housing apertures.

As has previously been mentioned, the use of round rods for the support legs minimizes surface area on which debris may accumulate and facilitates their fabrication. The legs are formed to offer suitable impact absorbing characteristics. In the illustrated embodiment, the form is that of an L. Also, the configuration of the leg ends is such as to minimize the force required for insertion of the legs into the junction seals and yet maximize the force of removal. The tapered end of the support legs pilots the leg into the axle holes. The novel construction of this caster permits the provision of different caster offsets and overall heights by merely using different legs. It can readily be appreciated that a wide variety of lengths and shapes of legs of the type illustrated can be obtained with little difficulty. Referring to FIG. 3, it will be observed that the top seal 91 in this instance is slightly different from that employed in FIGS. 1 and 2. The chamfer 92 is provided on the top washer 47. The seal is stretched in assembly and therefore bears on the chamfer 92 in the same manner as it bears on the chamfer 69 of the bearing housing. The bearing housing is therefore free to rotate with respect to the top washer and the seal, which is not permanently attached to either chamferred surface, will slide on whichever of the two offers the least resistance whenever the bearing housing is rotated.

It is believed that the present invention provides the best existing solution to problems of corrosion and contamination of casters. All external surfaces are smooth and resist the collection of debris. All external surfaces are readily accessible for thorough cleaning and the entire caster can be easily disassembled for cleaning to the highest possible sanitary standards. Whereas the cost of using stainless steel in conventional caster construction would be prohibitive, the construction of the present invention permits manufacture with non-corrodible materials including stainless steel, economically and easily. The present invention, therefore, achieves all of the objects set out here and above as well as others not specifically set out.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims wherein the expression plate is used generically and therefore encompasses plate 44 of FIG. 1 as well as washer 47 of FIG. 3.

The invention claimed is:
1. A caster comprising:
a pivot means;
a leg mounted to said pivot means;
an axle having a transverse aperture therein, with a portion of said leg disposed in said aperture;
a wheel mounted to said axle;
and resilient means having an aperture therein located in registry with said axle aperture, a second portion of said leg immediately adjacent the portion disposed in the axle aperture being disposed in said aperture in said resilient member, said resilient member and said leg having interengaging portions to retain said second leg portion in the said aperture of said resilient member for retaining said first leg portion in said axle aperture.

2. The caster of claim 1 wherein said resilient member includes a projection projecting into said axle aperture.

3. The caster of claim 1 wherein said axle is completely enclosed by the wheel and said resilient means.

4. A caster comprising:
pivot means attachable to a vehicle;
a leg pivotally mounted to said pivot means;
an axle connected to said leg;
a wheel mounted to said axle;

and resilient means mounted on said axle and sealingly engaging said wheel, said axle being completely enclosed by said wheel and resilient means, with said leg projecting through a portion of said resilient means engaging said axle, connection of said axle to said leg being inside said resilient means.

5. The caster of claim 1 wherein said resilient member embraces a portion of said wheel providing a seal.

6. A caster comprising:
pivot means attachable to a vehicle to be supported by the caster;
a load transmitting member pivotally mounted to said pivot means;
an axle;
a wheel mounted to said axle;
a resilient member mounted to said axle adjacent an end thereof;
and a leg mounted to said load transmitting member and extending downwardly and rearwardly therefrom and having a lower portion received in said resilient member and connected to said axle,
said axle having a transverse aperture therein adjacent one end thereof, and said resilient member having an aperture therein disposed in registry with said aperture in said axle, the lower portion of said leg extending through said aperture in said resilient member and into the said aperture in said axle to thereby maintain the position of said resilient member on said axle.

7. A caster comprising:
pivot means attachable to a vehicle to be supported by the caster;
a load transmitting member pivotally mounted to said pivot means;
an axle;
a wheel mounted to said axle;
a resilient member mounted to said axle adjacent an end thereof;
and a leg mounted to said load transmitting member and extending downwardly and rearwardly therefrom and having a lower portion received in said resilient member and connected to said axle,
said wheel having a hub with a circular surface therein, and said resilient member having a cavity therein with a circular wall, said hub extending into said cavity and the wall of said cavity embracing the circular surface of said hub to provide a seal around said hub.

8. The caster of claim 7 further comprising:
a washer disposed in said cavity between the end of said hub and said resilient member.

References Cited by the Examiner

UNITED STATES PATENTS

| 564,323 | 7/96 | Wynkoop. | |
| 696,499 | 4/02 | Schaibly | 16—45 |
| 2,241,686 | 5/41 | Ware. | |
| 2,960,717 | 11/60 | Moore | 16—21 |
| 2,962,329 | 11/60 | Moore | 16—46 X |
| 2,998,617 | 9/61 | Murphy | 16—21 |
| 3,097,887 | 7/63 | Carpenter | 301—1 |

FOREIGN PATENTS 6,518  6/01  Great Britain.

DONLEY J. STOCKING, *Primary Examiner.*